United States Patent [19]

Asai et al.

[11] 4,272,559
[45] Jun. 9, 1981

[54] METHOD FOR SURFACE TREATMENT OF SHAPED ARTICLES OF POLYVINYL CHLORIDE RESINS

[75] Inventors: Michihiko Asai, Fujisawa; Keishiro Tsuda; Akira Okada, both of Yokohama, all of Japan

[73] Assignees: Agency of Industrial Science and Technology; Ministry of International Trade & Industry, both of Tokyo, Japan

[21] Appl. No.: 955,211

[22] Filed: Oct. 27, 1978

[30] Foreign Application Priority Data

Nov. 1, 1977 [JP] Japan .................. 52/131094

[51] Int. Cl.³ ............................. B05D 3/06
[52] U.S. Cl. .................. 427/54.1; 204/159.2; 250/492 R; 427/444
[58] Field of Search .............. 427/54.1, 444; 204/159.2, 159.17; 250/492 R, 492 B

[56] References Cited

U.S. PATENT DOCUMENTS

| | | | |
|---|---|---|---|
| Re. 25,164 | 5/1962 | Cline | 427/54 |
| 2,050,595 | 8/1936 | Wolfe | 427/54 |
| 2,057,671 | 10/1936 | Dreyfus | 427/54 |
| 2,684,305 | 7/1954 | Quinlivan | 427/54 |
| 3,081,485 | 3/1963 | Steigerwald | 250/492 B |
| 3,125,546 | 3/1964 | Pinner et al. | 204/159.17 |
| 3,783,004 | 1/1974 | Parker | 427/54 |
| 3,963,848 | 6/1976 | Bentley et al. | 427/54 |
| 3,978,341 | 8/1976 | Hoell | 250/492 R |
| 4,057,657 | 11/1977 | Garnett et al. | 427/54 |

FOREIGN PATENT DOCUMENTS

| | | | |
|---|---|---|---|
| 50-22872 | 3/1975 | Japan | 427/54 |
| 51-7712 | 3/1976 | Japan | 427/54 |

Primary Examiner—Ronald H. Smith
Assistant Examiner—S. L. Childs
Attorney, Agent, or Firm—Oblon, Fisher, McClelland & Maier

[57] ABSTRACT

Shaped articles of polyvinyl chloride resins containing low-molecular plasticizers are irradiated with ultraviolet light of a wavelength in the vacuum ultraviolet region to cause the shaped articles to form therein a cross linked layer capable of preventing otherwise possible exudation of plasticizers to their surface.

2 Claims, 1 Drawing Figure

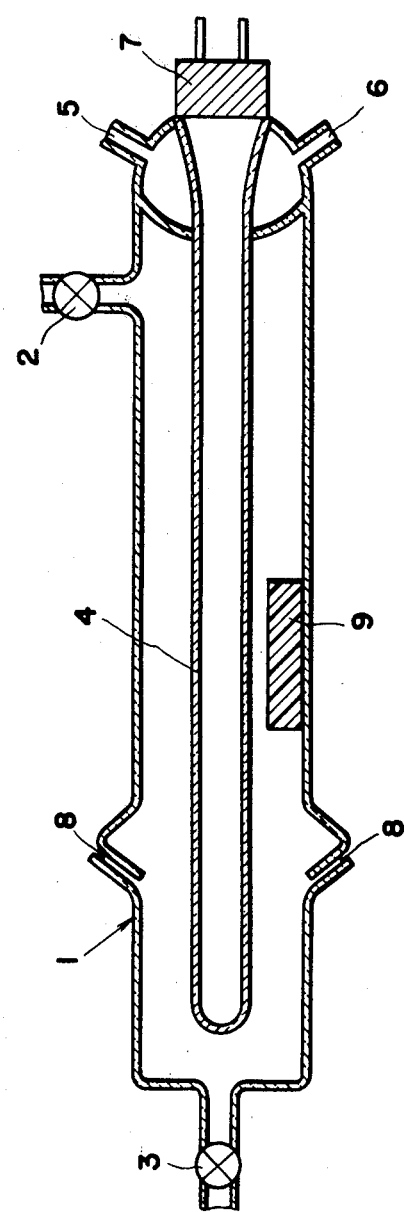

METHOD FOR SURFACE TREATMENT OF SHAPED ARTICLES OF POLYVINYL CHLORIDE RESINS

BACKGROUND OF THE INVENTION

This invention relates to a method for the surface treatment of shaped articles of polyvinyl chloride resins containing low-molecular plasticizers, which surface treatment is directed to precluding the possibility of the plasticizers migrating or diffusing toward the surface and exuding on the surface of the shaped articles with lapse of time or the possibility of the plasticizers exuding out of the shaped articles and transferring into other objects with which the shaped articles are held in intimate contact.

Polyvinyl chloride resins are one class of inexpensive plastic materials used extensively in films, artificial leathers, insulating coats for electric wires and cables, floorings, tubings and plates, fibers and sponge foams. Plasticized non-rigid type articles of polyvinyl chloride resins generally contain from 15 to 50% by weight of low-molecular plasticizers. When such products are held in intimate contact with other objects of gaseous, liquid and solid states, the plasticizers transfer into such other objects and give them undesirable effects.

For example, the insulating coats used for covering electric wires are chiefly made of polyvinyl chloride resins. Since these coats are constantly exposed to the heat issuing from the passage of electric current in the wires, any low-molecular plasticizers present in the coats are vapourized into the atmosphere and cause deteriolation of the physical properties of the resin. Because of such adverse effects, low-molecular plasticizers cannot be used in such coats and it is necessary to use polymeric plasticizers. When polyvinyl chloride resins containing low-molecular plasticizers are used for interior finish such as floorings and wall coverings, the plasticizers contained therein diffuse within and exude on the surface of the floorings and wall coverings and induce the so-called phenomenon of blocking. Consequently, the exuding plasticizers cause surface staining and bring about similar other adverse effects. Further, when a shaped article of plasticized polyvinyl chloride resins are brought into liquid substances such as, for example, oils and organic solvents, the plasticizers contained in the shaped articles are extracted into such liquid substances, leaving the products with decreased plasticizer contents. Consequently, the products have their properties deteriolated by the loss of plasticizers. When such shaped articles are brought into contact with solutions containing such fat-dissolving components as soap water, foodstuffs such as milk and edible oils and living-body components such as blood and body fluids, the plasticizers exude and transfer into such substances and seriously contaminate them. Consequently, the use of such polyvinyl chloride resins as the materials of containers for cosmetic products, packaging materials for foodstuffs and materials for medical wares must be under specific care. Also in the case of agricultural purpose polyvinyl chloride resin films containing low-molecular plasticizers, the plasticizers exude to the surface of the films which they are in storage or in use and bring about the phenomenon of blocking, the decrease in the transparency to light and other undesirable phenomena.

With a view to curbing the possible transfer into other objects of the plasticizers contained in plasticized shaped articles of polyvinyl chloride resins there have been adopted various measures designed to modify fabrication technology. There have been proposed various methods for preventing the blocking and migration of plasticizers to a contacting body from the articles. Examples are (1) a method of using instead of low-molecular plasticizers non-migrating, non-extractable polymeric plasticizers such as polyester plasticizers, (2) a method of coating the flexible shaped articles of polyvinyl chloride resins with various surface treatment agents such as acrylic resins, polyurethane resins, polyamide resins and other similar resins which are prepared in the form of film-forming agents, (3) a method of adding to the resins such substances as aliphatic amides, silicone fluids, silica filler, diatomaceous earth, kaolin and talc which are effective in the prevention of the blocking phenomenon. The above described methods can not free from their respective problems. For example, polymeric plasticizers are more expensive and yet are less effective than low-molecular plasticizers. The method of coating the shaped articles with some other resins has a disadvantage that the coating operation is not easy to perform and the coat tends to peel off upon contact with other solids during a prolonged use of the articles. Addition of special components entails a sacrifice of some other desirable properties and fails to bring about the intended effect as expected. Thus, need has long been felt for development of a method which, by means of a simple treatment, provides effective prevention of the exudation of plasticizers from plasticized shaped articles of polyvinyl chloride resins.

An object of the present invention is to provide a method which, though simple in operation as compared with the conventional methods, provides effective prevention of the exudation of low-molecular plasticizers contained in shaped articles of polyvinyl chloride resins.

SUMMARY OF THE INVENTION

The inventors continued a devoted study in search of an effective method satisfying the requirement, and they have consequently ascertained that the exudation of low-molecular plasticizers contained in shaped articles of polyvinyl chloride resins can be precluded by a simple yet effective method of irradiating the surface of such shaped articles with an ultraviolet light of a wavelength in the range of from 105 nm to 200 nm. The present invention has been accomplished on the basis of this knowledge.

To be specific, the present invention aims to provide a method for the surface treatment of shaped articles of polyvinyl chloride resins containing low-molecular plasticizers, which comprises irradiating the surface of the shaped articles with an ultraviolet light of a wavelength in the range of from 105 nm to 200 nm by use of an artificial light source and thereby causing the shaped articles to form in the surface portion thereof a highly dense cross-linked layer capable of keeping the plasticizers from exuding to their surface.

BRIEF EXPLANATION OF THE DRAWING

The FIGURE of the drawing represents a sectioned view of the treatment system to be used for working the method of this invention.

DETAILED DESCRIPTION OF THE INVENTION

It has been known in the art that irradiation of polyvinyl chloride with an ultraviolet light induces the dehydrochlorination reaction, produces polyenes and consequently causes coloration, severs high polymer chains and brings about destruction of resins. Thus, the aforementioned discovery that the irradiation of shaped articles of polyvinyl chloride resins with ultraviolet light of a wavelength of from 105 nm to 200 nm causes the articles to form in the surface portion thereof a highly dense cross-linked layer capable of serving as an effective barrier against exudation of low-molecular plasticizers to the surface without impairing the inherent properties of the resins has surpassed all expectations.

Now, the present invention will be described in detail.

The polyvinyl chloride resins for which the method of the present invention effectively operates embrace those of homopolymers of vinyl chloride and those of copolymers formed preponderantly of vinyl chloride. Examples of comonomers which are copolymerized to produce such vinyl chloride copolymers are vinyl esters; vinyl ethers, acrylic acid, methacrylic acid and esters thereof; maleic acid, fumaric acid, anhydrides thereof and esters of these acids and anhydrides; aromatic vinyl compounds; halogenated vinylidenes and vinyl halides other than vinyl chloride; acrylonitrile and methacrylonitrile; and olefins such as ethylene and propylene.

Preferably these copolymers contain such comonomers in the amount of 1-30% by weight.

For the purpose of adjusting the flexibility or rigidity of shaped articles of polyvinyl chloride resins, there are used low-molecular plasticizers. Examples of low-molecular plasticizers effective for the purpose include esters of phthalic acid such as di-2-ethylhexyl phthalate, di-n-octyl phthalate, dibutyl phthalate and butylbenzyl phthalate; esters of aliphatic dibasic acid such as dioctyl adipate and dibutyl sebacate; glycol esters such as diethylene glycol dibenzoate; esters of pentaerythritol; aliphatic esters such as methyl acetylicinolate; esters of phosphoric acid such as tricresyl phosphate and triphenyl phosphate; epoxidized oils such as epoxidized soybean oil and epoxidized linseed oil; esters of citric acid such as acetyltributyl citrate and acetyltrioctyl citrate; and aromatic esters such as trialkyl trimellitates and tetra-n-octyl pyromellitate. These low-molecular plasticizers are added in amounts in the range of from 20 to 100 parts by weight per 100 parts by weight of the aforementioned polyvinyl chloride resins.

Other additives are usable for the purpose of improving the shaped articles in their thermal resistance, lubricity, aging resistance, etc. Examples of effective stabilizers are metal salts of carboxylic acids such as calcium stearate, zinc stearate, lead stearate, barium stearate and cadmium stearate; tribasic lead sulfate; dibasic lead phosphite; and organic tin compounds such as dibutyl tin dilaurate, di-n-octyl tin maleate and di-n-octyl tin mercaptide. Examples of effective lubricants are esters such as butyl stearate; aliphatic acid amides such as ethylenebis stearoamide; higher fatty acids and esters thereof; and various grades of polyethylene waxes. Examples of other additives used in the fabrication of polyvinyl chloride resins are fillers, antioxidants, ultraviolet absorbers, antistatic agents, anti-dew agents, pigments, dyes and cross linking aids. Generally, these additives are used in amounts of not more than 10 parts by weight per 100 parts by weight of polyvinyl chloride resins to suit the respective intended uses.

Various polymeric rubbery elastomers may also be admixed with polyvinyl chloride resins. Examples of effective polymeric rubbery elastomers are ethylenevinyl acetate copolymers, acrylonitrile-butadiene copolymers, styrene-butadiene copolymers, methyl methacrylate-styrene-butadiene copolymers, acrylonitrile-styrene-butadiene copolymers, polyurethane elastomers, polyamide resins, caprolactam polymers and epoxy-modified polybutadiene resins. Preferably, these elastomers are used in amounts of not more than 50 parts by weight per 100 parts by weight of polyvinyl chloride.

The method of the present invention is used on the shaped articles obtained by fabrication of polyvinyl chloride resin compositions formulated as described above. The fabrication of these compositions can be effected by using any of the methods heretofore adopted for the manufacture of shaped articles of polyvinyl chloride resins, such as extrusion molding, injection molding, calendering, inflation molding and compression molding. The method of this invention is not particularly limited by the kind and shape of such shaped articles.

The present invention necessitates use of an ultraviolet light of a wavelength in the range of from 105 nm to 200 nm. No effective formation of a cross-linked layer is obtained by using an ultraviolet light of a wavelength falling outside the limits of the range mentioned above.

As the source of the ultraviolet light of the stated wavelength, there may be effectively used any discharge lamp which is filled with a proper gas capable of emitting lines spectrum or continuous spectrum and provided with a proper window material. Advantageous discharge tubes are those currently used in fields requiring use of vacuum ultraviolet source. Examples of such discharge tubes are hydrogen or rare gas discharge tubes using lithium fluoride, calcium fluoride and fused quartz as window materials and argon/mercury low-pressure lamps. When a given light source emits lights of wavelengths falling outside the range of from 105 to 200 nm in addition to the ultraviolet light of a wavelength falling in the stated range, use of the light source entails no problems in particular unless the additionally emitted lights reduce the objective effects of the ultraviolet irradiation in accordance with the inventive method, impair the surface conditions of shaped articles, cause discoloration or bring about other similarly adverse effects on the shaped articles.

The treatment by the irradiation with this ultraviolet light can be effectively performed under a vacuum, in air or in the atmosphere of one of the component gases of air, such as oxygen or nitrogen. Generally in the so called vacuum ultraviolet region, the oxygen of the air which is present in the path of light absorbs light. To preclude this trouble, therefore, it is desirable that of the reaction system should be vaccumized or use an atmosphere nitrogen gas. In the present invention, however, the surface treatment given to the shaped articles of polyvinyl chloride resins can be effectively performed without reference to the presence of air in the path of light.

It is a difficult matter to designate a definite length of time for the surface treatment of the present invention without accurate actinometry of the ultraviolet light, because treatment time largely depends upon the intensity of the light in use. In the case of a 30-W argon/mercury lamp, for example, a time in the range of from 1 to 60 minutes is sufficient for the treatment, when the articles to be irradiated are positioned at a distance of several centimeters from the lamp. This treatment by the irradiation of the ultraviolet light produces in the surface portion of a given shaped article a highly densely cross-linked layer of an extremely small thickness less than $1\mu$. While the cross-linked layer sufficiently functions as a barrier against diffusion of the plasticizer present in the shaped article, it does not impair the inherent properties of the polyvinyl chloride resins in the shaped article owing to its extremely small thickness.

Now, one preferred embodiment of this invention will be described with reference to the attached drawing.

The drawing represents a sectioned view of an example of the reaction system used for working the present invention.

This system comprises a main body 1 formed of a hard glass tube and a low-pressure mercury lamp 4 disposed within the main body 1 and having the vapors of mercury and argon sealed therein. A polyvinyl chloride resin sheet 9 to be treated is inserted through a ground portion 8 and mounted in position substantially at the center of the system. The air inside the body 1 is evacuated by pumping through the valve 2 or 3 to a desired degree of vacuum and, the vacuum is maintained by keeping the valves 2 and 3 closed or by continued evacuation. Then the application of the ultraviolet light upon the resin sheet is carried out, with the lamp cooled by continuously introducing cooling water through an inlet 5 and discharging it through an outlet 6. In the drawing, the numeral 7 denotes a terminal for application of electric power. The irradiation in the presence of air is accomplished in this system by keeping the air discharge cocks fully opened, and the irradiation in the presence of oxygen or nitrogen is accomplished by passing the gas through the valves 2 and 3.

As a result of the irradiation, a cross-linked layer of a thickness in the range of from 0.3 to $1.0\mu$ is formed in the surface portion of the polyvinyl chloride resin sheet. The thickness of this layer can be measured by staining this layer with osmic acid, for example, and observing the stained layer under a transmission electron microscope.

The method of this invention, by a simple treatment, provides substantially perfect control of the exudation of plasticizers in shaped articles of plasticized polyvinyl chloride resins. Thus, it can be advantageously applied to the shaped articles of polyvinyl chloride resin such as packaging materials for foodstuffs, articles for medical uses, shelters and containers for agricultural uses and building materials.

Now, the present invention will be described more specifically with reference to working examples.

The purposes of the experiments dealt with in these working examples are as follows:

Polyvinyl chloride resins containing low-molecular plasticizers are used extensively in shaped products including articles for medical uses, packaging materials for foodstuffs, insulating coats for electric wires and cables, articles for agricultural uses and building materials. In these various uses, the fact that plasticizers used in the shaped articles exude to their surface and even transfer into contacting objects had posed a serious problem. Example 1 illustrates the effect brought about by the method of this invention in preventing the transfer of plasticizers into living-body components which poses a problem with respect to articles for medical treatments and containers for foodstuffs, with a blood component used as the extractant. Example 2 illustrates the oil-resistance which the treatment by the method of this invention imparts to shaped articles in various uses, with a representative organic solvent n-hexane used as an extractant. Example 3 illustrates the effect of the method of this invention exhibited in the prevention of transfer of plasticizers into other plastics, with polystyrene resins used by way of example.

The exudation of plasticizers to the surface of the articles leading to the elution or migration is a phenomena originating in the diffusion of such plasticizers to the surface of shaped articles or polyvinyl chloride resins. The effect of the treatment of this invention in the prevention of such transfer of plasticizers, therefore, can be satisfactorily evaluated by extraction tests using organic solvents such as n-hexane and ethyl alcohol.

EXAMPLE 1

A system illustrated in the drawing was constructed of a hard glass tube 6 cm in diameter and 30 cm in length as a main body and a 30-W low-pressure mercury lamp having mercury and argon vapors sealed in a high-silica glass (Suprasil, Heraeus GmbH, West Germany) tube as a lamp. A given specimen was placed concentrically with the axis of the lamp at a distance of 3 cm from the center of the lamp and was irradiated with the light from the lamp. This lamp emitted line spectra at 185, 254, 313, 365, 436 and 547 nm having relative intensities of 21, 47, 10, 2, 3 and 14, respectively.

The specimen used herein was a disc-shaped sheet $300\mu$ in thickness and 6 cm in diameter and made of a polyvinyl chloride resin containing 32% by weight of di-2-ethylhexyl phthalate, 1% by weight of barium stearate and 1% by weight of zinc stearate and the balance of polyvinyl chloride. The specimen was dried under a vacuum, then placed in the system and irradiated with the light for a stated period in Table 1 under a vacuum of $10^{-3}$ Torr produced by tightly sealing the system and subsequently pumping out the entrapped air from the system interior.

The treatment caused the sheet to form in the surface portion thereof a thin cross-linked layer less than 0.5 $\mu$m in thickness. This fact was confirmed by staining the sheet with osmic acid and observing the stained sheet under a transmission electron microscope. Gel fractionation using tetrahydrofuran as a solvent was confirmed to have formed 0.14 mg of insoluble gel per cm$^3$ after 40 minutes of the treatment. Surface examination by the photoelectron spectroscopy with a DuPont's spectrometer, Model 650, using magnesium-$k_\alpha$ ray showed that, in the treated sheet, the intensity of the chlorine atom of about 200 eV of binding energy was one tenth of the level shown by the untreated specimen.

Then, the sheet was placed in the lower portion of a cylindrical container of glass so that only the treated surface of the sheet would be exposed to contact with 50 ml of bovine blood plasma and the container was shaken at 37° C. for 24 hours. After this shaking, the bovine blood plasma was assayed by the method of R. J. Jaeger et al. [New England Journal of Medicine, Vol. 287, page 1114 (1972)] to determine the amount of the plasticizer transferred into the bovine blood plasma. To be more specific, the bovine blood plasma was mixed with a chloroform-methanol mixed solvent, subjected to vigorous shaking and then centrifugally separated into three layers of water, protein and solvent. In the solvent layer, di-2-ethylhexyl phthalate was concentrated. Then, this layer was evporated to dryness. The evaporation residue was dissolved in n-hexane and then analyzed by a gas chromatograph using an OV-17 column. In this analysis, di-n-octyl phthalate was used for the compensation of recovery ratio and dinonyl phthalate as the standard of concentration.

The analysis showed that after 1, 5, 10, 20 and 40 minutes of the surface treatment described above, the amounts of di-2-ethylhexyl phthalate transferred into the bovine blood plasma were as given in Table 1 below.

TABLE 1

| Time of surface treatment (minutes) | Amount of di-2-ethylhexyl phthalate (mg/50 ml of bovine blood plasma) |
| --- | --- |
| 1 | 0.10 |
| 5 | 0.05 |
| 10 | 0.04 |
| 20 | 0.05 |
| 40 | 0.02 |

Even after the treated sheet was further heated at 80° C. for one hour, this effect was retained intact, indicating that the heating did not affect the cross-linked layer formed in the surface portion of the sheet. When the untreated sheet was subjected to the same analysis, the amount of di-2-ethylhexyl phthalate dissolved into the bovine blood plasma was found to be 1.20 mg per 50 ml of plasma.

The same surface treatment with the light as described above was carried out in the presence of air of atmospheric pressure, with the cocks 2, 3 kept open. In the air of 1 atm., while the light traveled the distance of 3 cm from the light source to the surface of the specimen, the oxygen in the air absorbed 185 nm of light. This means that the amount of the light reaching the specimen was 66% of the amount of light delivered in the treatment performed under a vacuum and the effect of the surface treatment, it is considered, would be proportionately lowered. Actually, no such decline in the effect of the surface treatment was observed. In the presence of air, the effect of the treatment was the same as under a vacuum.

Separately, the lamp 4 of the system illustrated in the drawing was covered with a filter of glass opaque to the light of wavelength of shorter than 200 nm so that only the light having a wavelength of more than 200 nm would reach the surface of the sheet. When the surface treatment was performed under these conditions, the amount of the plasticizer present in the sheet which was consequently dissolved out into the bovine blood plasma was the same as in the case of the untreated sheet. In this treatment, no effect was recognized. The results clearly indicate that of the various lights emitted from the lamp, only the light having a wavelength of 185 nm gave an effective surface treatment in preventing the exudation of plasticizer into the blood plasma.

EXAMPLE 2

By following the procedure of Example 1, a disc (6 cm in diameter) of a sheet 100 μm in thickness and made of a polyvinyl chloride resin containing 30% by weight of di-2-ethylhexyl phthalate as plasticizers, 1% by weight of calcium stearate and 1% by weight of lead stearate and the balance of polyvinyl chloride was subjected to the surface treatment with the light.

Then, the sheet which had undergone the treatment for 20 minutes was placed on the bottom of the same elution test container as used in Example 1 and 50 ml of n-hexane was added to the container. The container was shaken at 40° C. for five hours. After the shaking, the n-hexane was analyzed by a gas chromatograph using dinonyl phthalate as the standard for concentration to determine the amount of di-2-ethylhexyl phthalate extracted from the sheet into the n-hexane. It was found that 20 mg of di-2-ethylhexyl phthalate was extracted into 50 ml of n-hexane. In the case of the untreated sheet, the amount of di-2-ethylhexyl phthalate thus extracted was 200 mg.

EXAMPLE 3

By following the procedure of Example 1, a 5 cm×6 cm rectangle cut from a sheet 400 μm in thickness and made of a polyvinyl chloride resin containing 33% by weight of di-2-ethylhexyl phthalate as plasticizers and 2% by weight of dibutyl laurate and the balance of polyvinyl chloride was subjected to the surface treatment with the light for 30 minutes. Thereafter, the sheet was brought into face-to-face contact with a polystyrene sheet having the same area and a thickness of 3 mm. The two contacted sheets were placed between two opposed glass sheets and left to stand under a load of 1.5 kg at 70° C. for seven days. At the end of this period, the glass sheets were removed and the polystyrene sheet was dissolved in toluene and then precipitated in n-hexane. The supernatant was analyzed by a gas chromatograph to determine the amount of di-2-ethylhexyl phthalate transferred from the polyvinyl chloride resin sheet into the polystyrene sheet. In this analysis, dioctyl sebacate was used for the compensation of recovery ratio and di-n-octyl phthalate was used as the standard of concentration. It was found consequently that the amount of di-2-ethylhexyl phthalate transferred from the treated sheet to the polystyrene sheet was 0.9 mg. In the case of the untreated sheet, the amount of 21 mg.

EXAMPLE 4

A composition made up of 100 parts by weight of polyvinyl chloride resin, 1.5 parts by weight of calcium stearate, 1.5 parts by weight of lead stearate and a varying amount of a varying plasticizer indicated below was blended in a two-roll mill at 160° C. for 10 minutes. The compounded mixture was compression-molded at 165° C. to produce a sheet 1 mm in thickness. This molded sheet was subjected to the surface treatment with the light in entirely the same way as in Example 1. The specimen thus obtained was tested for extraction of plasticizer by using hexane or ethyl alcohol in the same way in Example 3. The amount of the plasticizer extracted in the test was as shown in Table 2. The amount of plasticizer extracted similarly from the specimen which had not been given the surface treatment is also shown in Table 2.

TABLE 2

| | | 1 | 2 | 3 | 4 | 5 |
| --- | --- | --- | --- | --- | --- | --- |
| Plasticizer | | DBP | TOTM | TCP | DOA | DOS |
| Plasticizer content (parts by weight) | | 50 | 50 | 30 | 30 | 30 |
| Extractant used | | H | H | EA | H | H |
| Period of extraction (hours) | | 2 | 2 | 2 | 2 | 2 |
| Amount of plasticizer extracted | Specimen for surface treatment | 15 | 16 | .2 | 6 | 8 |
| | Specimen without treatment | 144 | 159 | 11 | 40 | 50 |

TABLE 2-continued

|  | 1 | 2 | 3 | 4 | 5 |
| --- | --- | --- | --- | --- | --- |
| (mg) | | | | | |

DBP: Di-n-butyl phthalate
TOTM: Tri-2-ethylhexyl trimellitate
TCP: Tricresyl phosphate
DOA: Di-2-ethylhexyl adipate
DOS: Di-2-ethylhexyl sebacate
H: Hexane
EA: Ethyl alcohol

What is claimed is:

1. A process for preventing low molecular weight plasticizers from migrating to the surface of a shaped poly(vinyl chloride) article which contains such plasticizers in amounts of 15 to 50% by weight comprising irradiating the poly(vinyl chloride) at the surface of said article with ultra-violet radiation having a wavelength in the range from 105–200 nm in an environment selected from the group consisting of vacuum, nitrogen, oxygen or air whereby a highly cross-linked layer of poly(vinyl chloride) is formed at the surface of said article which prevents the migration of said low molecular weight plasticizers.

2. The method according to claim 1, wherein the low-molecular weight plasticizer is selected from the group consisting of esters of an aromatic carboxylic acid, esters of an aliphatic dibasic acid, esters of phosphoric acid, derivatives of an aliphatic ester, epoxy-containing plasticizers and chlorine-containing plasticizers.

* * * * *